United States Patent
Sadjadi et al.

(10) Patent No.: US 10,227,119 B2
(45) Date of Patent: Mar. 12, 2019

(54) PASSIVE UNDERWATER ODOMETRY USING A VIDEO CAMERA

(71) Applicant: LOCKHEED MARTIN CORPORATION, Bethesda, MD (US)

(72) Inventors: Firooz A. Sadjadi, Bethesda, MD (US); Sekhar C. Tangirala, Bethesda, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/489,016

(22) Filed: Apr. 17, 2017

(65) Prior Publication Data

US 2017/0301098 A1    Oct. 19, 2017

Related U.S. Application Data

(60) Provisional application No. 62/323,123, filed on Apr. 15, 2016.

(51) Int. Cl.
| | |
|---|---|
| *G06K 9/00* | (2006.01) |
| *B63G 8/38* | (2006.01) |
| *G01P 3/38* | (2006.01) |
| *G06T 7/246* | (2017.01) |
| *B63G 8/00* | (2006.01) |

(52) U.S. Cl.
CPC ............. *B63G 8/38* (2013.01); *G01P 3/38* (2013.01); *G06T 7/246* (2017.01); *B63G 2008/002* (2013.01); *G06T 2200/32* (2013.01); *G06T 2207/10016* (2013.01); *G06T 2207/30252* (2013.01)

(58) Field of Classification Search
CPC combination set(s) only.
See application file for complete search history.

(56) References Cited

U.S. PATENT DOCUMENTS

| | | | |
|---|---|---|---|
| 2014/0169627 A1* | 6/2014 | Gupta | G06K 9/00805 382/103 |
| 2014/0169633 A1* | 6/2014 | Seyfried | G06K 9/00791 382/105 |
| 2015/0269446 A1* | 9/2015 | Takemae | G06K 9/00798 382/199 |
| 2016/0189393 A1* | 6/2016 | Rao | G06K 9/00798 701/41 |

(Continued)

FOREIGN PATENT DOCUMENTS

WO     WO2010046989     *   4/2010   ............ H04N 7/01

OTHER PUBLICATIONS

M. A. Fischler and R. C. Bolles, "Random Sample Consensus: A Paradigm for Model Fitting with Applications to Image Analysis and Automated Cartography," Communications of the ACM, vol. 24, No. 6 (1981), p. 381-395.

(Continued)

*Primary Examiner* — Jerome Grant, II
(74) *Attorney, Agent, or Firm* — Hamre, Schumann, Mueller & Larson, P.C.

(57) ABSTRACT

Systems and methods are described where odometry information that is obtained from a video camera mounted on an underwater vehicle is used to estimate the velocity of the underwater vehicle. The techniques described herein estimate the velocity of the underwater vehicle passively without emitting sound or other energy from the underwater vehicle.

6 Claims, 6 Drawing Sheets

(56) References Cited

U.S. PATENT DOCUMENTS

2017/0174128 A1* 6/2017 Hu ........................ B60R 1/00
2017/0213078 A1* 7/2017 Guerrini ............ G06K 9/00335
2018/0211117 A1* 7/2018 Ratti ................. G06K 9/00785

OTHER PUBLICATIONS

G. Golub and W. Kahan, "Calculating the Singular Values and Pseudo-Inverse of a Matrix," Journal of the Society for Industrial and Applied Mathematics: Series B, Numerical Analysis, vol. 2, No. 2 (1965), p. 205-224.
C. Harris and M. Stephens, "A Combined Corner and Edge Detector," Proceedings of the 4th Alvey Vision Conference, 1988, p. 147-151.
K. Levenberg, "A Method for the Solution of Certain Non-Linear Problems in Least Squares," Quarterly of Applied Mathematics, vol. 2, No. 2 (1944), p. 164-168.
D. W. Marquardt, "An Algorithm for Least-Squares Estimation of Nonlinear Parameters," Journal of the Society for Industrial and Applied Mathematics, vol. 11, No. 2 (1963), p. 431-441.
R. Schettini and S. Corchs, "Underwater Image Processing: State of the Art of Restoration and Image Enhancement Methods," EURASIP Journal on Advances in Signal Processing, 2010, 14 pages.
S. Wirth et al., "Visual Odometry for Autonomous Underwater Vehicles," Oceans—Bergen, 2013 MTS/IEEE, 2013, 6 pages.

\* cited by examiner

PASSIVE UNDERWATER ODOMETRY USING A VIDEO CAMERA

FIELD

This disclosure relates to underwater vehicles and estimating the rate of travel or velocity of the underwater vehicle.

BACKGROUND

Underwater vehicles have typically relied upon acoustic sonar to determine their velocity. Acoustic sonars emit energy and therefore they are not covert. These devices also have a relatively large size, weight and power, and are expensive.

SUMMARY

Systems and methods are described herein where odometry information that is obtained from a non-stereo video camera mounted on an underwater vehicle is used to estimate the velocity of the underwater vehicle in real-time on the underwater vehicle. The underwater vehicle can be a manned or unmanned underwater vehicle (UUV). The techniques described herein estimate the velocity of the underwater vehicle passively without emitting sound or other energy from the underwater vehicle. In the case of a UUV, the techniques described herein help reduce the size, weight, power, and cost needed to estimate the velocity of the UUV. In some embodiments, the techniques described herein can be used on land vehicles, air vehicles, and other non-underwater vehicles in order to estimate the velocity of the non-underwater vehicle while traveling on land, in the air, or on the surface of a body of water.

The techniques described herein utilize video of an underwater structure that is captured by a non-stereo video camera mounted on the underwater vehicle to provide a real-time estimate of the velocity of the underwater vehicle by analyzing two-dimensional image frames obtained from the video. The determined velocity estimate can be calculated in real-time on the underwater vehicle, and can be output to, for example, a navigation system of the underwater vehicle to aid the navigation system in controlling the underwater vehicle. In addition, the estimated velocity determinations, as well as the captured video and other calculations, can be stored on the underwater vehicle for later analysis at the end of the mission of the underwater vehicle.

The underwater structure can be any structure, naturally occurring and/or man-made. Examples of underwater structures include, but are not limited to, the sea floor, an undersea mountain, support legs of a structure such as a drilling platform, and other structures. The term underwater refers to any water environment including salt water, fresh water, or brackish water. The term sea floor is intended to encompass the floor of any body of water including salt water, fresh water, or brackish water.

In one embodiment, a method of real-time estimation of velocity of an underwater vehicle includes, as the underwater vehicle is traveling underwater, capturing video of an underwater structure using a non-stereo video camera mounted on the underwater vehicle. First and second two-dimensional image frames are then selected from the video, where the first and second two-dimensional image frames are captured at different times. The first and second two-dimensional image frames are then enhanced to produce enhanced first and second two-dimensional image frames. The velocity of the underwater vehicle is then estimated in real-time using, in part, the enhanced first and second two-dimensional image frames.

The techniques described herein are not limited to an underwater environment. In another embodiment, a method of real-time estimation of velocity of a vehicle includes, as the vehicle is traveling, capturing video of a structure that the vehicle is travelling past using a video camera mounted on the vehicle. First and second image frames are then selected from the video, where the first and second image frames are captured at different times. The first and second image frames are then enhanced to produce enhanced first and second image frames. The velocity of the vehicle is then estimated in real-time using, in part, the enhanced first and second image frames.

DETAILED DESCRIPTION

The following is a description of systems and methods where odometry information that is obtained from a non-stereo video camera mounted on a vehicle is used to estimate the velocity of the vehicle in real-time as the vehicle is traveling.

In one embodiment, the vehicle is an underwater vehicle. In another embodiment, the vehicle is a land vehicle, an air vehicle, or other non-underwater vehicle that travels on land, in the air, or on the surface of a body of water, whether manned or unmanned. For sake of convenience, the examples hereinafter described will refer to the vehicle as an underwater vehicle, in particular a UUV. However, the systems and methods described herein can be applied to manned underwater vehicles, as well as to land, air and other non-underwater vehicles as well. The concepts described herein can be used in any environment where one can derive features from the captured camera images to allow determination of how far the vehicle has moved between the captured image frames and thereby derive the velocity of the vehicle.

The determined estimated velocity can be used for any purpose. For example, in one embodiment the estimated velocity can be output to, for example, a navigation system of the underwater vehicle to aid the navigation system in estimating position of and controlling the underwater vehicle. In addition, the estimated velocity determinations, as well as the captured video and other calculations, can be stored on the underwater vehicle for later analysis at the end of the mission of the underwater vehicle.

As used throughout the specification and claims, an underwater vehicle refers to a maritime vehicle that is intended to be submersed or submersible in water, and that travels underwater during a portion of its use. In one embodiment, the underwater vehicle is not physically connected to a host vessel by a tether, umbilical, cable or the like. In another embodiment, the underwater vehicle is physically connected to a host vessel by a tether, umbilical, cable or the like. The underwater vehicle can operate in fresh water, salt or sea water, or brackish water. The underwater vehicle has a fuselage that can house, for example, sensors and other electronics for operation of the underwater vehicle. The fuselage also houses at least one electrical energy supply that supplies electrical energy for operation of the underwater vehicle. The underwater vehicle also includes a propulsion mechanism that provides propulsion for propelling the underwater vehicle through the water.

In some embodiments, the underwater vehicle can be a UUV in which a human does not reside in or on the underwater vehicle during operation of the underwater vehicle. Examples of UUVs include, but are not limited to, autonomous underwater vehicles (AUVs) and torpedoes.

In some embodiments, the underwater vehicle can be a manned underwater vehicle in which at least one human resides in or on the underwater vehicle during operation of the underwater vehicle. Examples of manned underwater vehicles include, but are not limited to, submarines, the SEAL Delivery Vehicle (SDV), British Mk 1 "chariot", the Pegasus swimmer propulsion device, and other diver assist vehicles such as those similar to the various underwater scooters once produced by Farallon USA.

Figure 1:
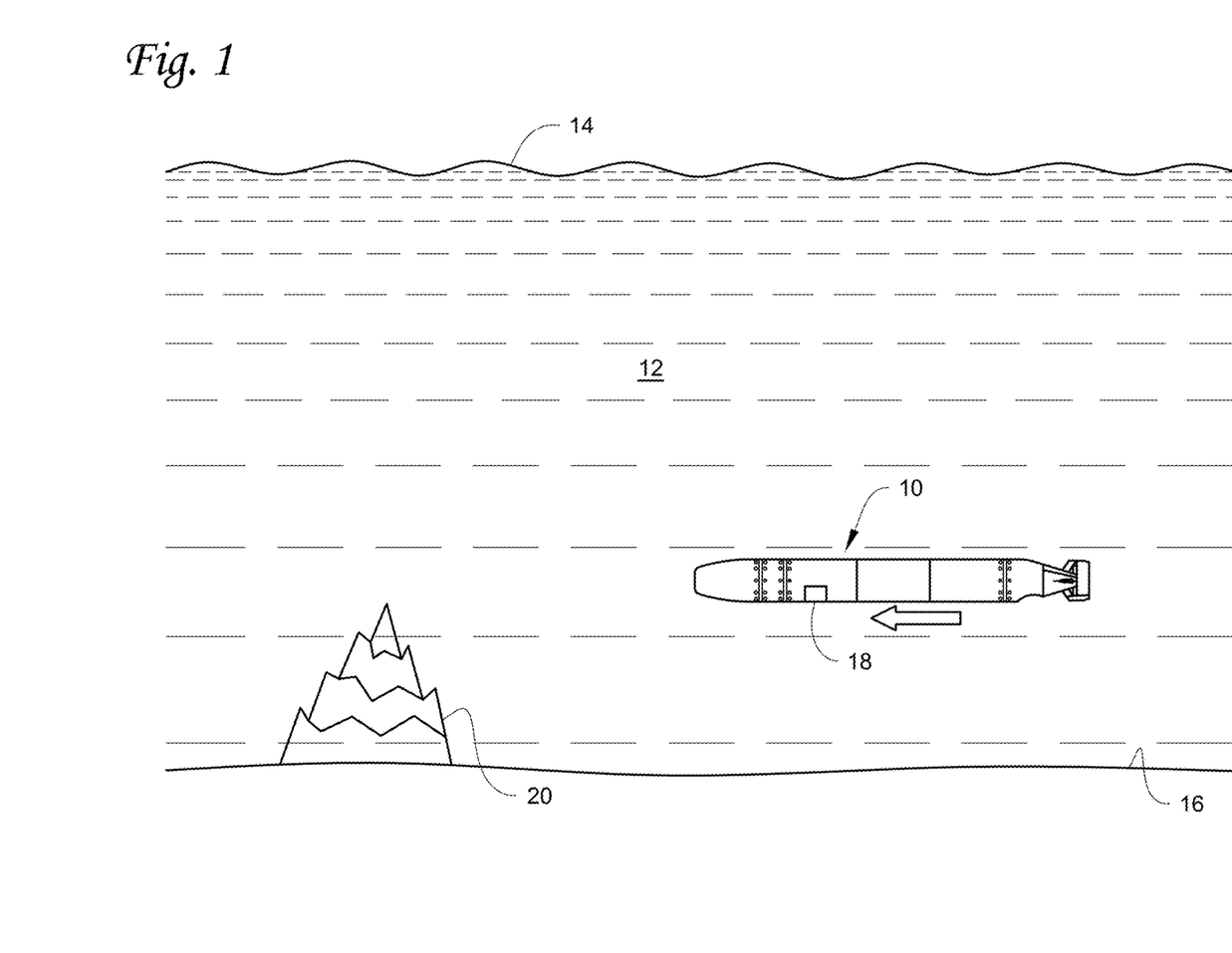
FIG. 1 illustrates an example an environment in which the underwater odometry technique described herein can be utilized.

Referring initially to FIG. 1, an example environment of the systems and methods described herein is illustrated. In this example, an underwater vehicle 10 is shown submerged in a body of water 12 beneath the surface 14. The underwater vehicle 10 is traveling in the direction of the arrow above the sea floor 16. A non-stereo video camera 18 (or a stereo camera where only one lens is used to capture an image) on the underwater vehicle 10 captures two-dimensional video of an underwater structure, such as the sea floor 16, an underwater mountain 20, support legs of a structure such as a drilling platform (not shown), and other natural or man-made structures, as the underwater vehicle 10 travels. The underwater structure(s) can be any structure(s) from which features can be derived from the captured images to allow determination of how far the vehicle has moved between a first image frame and a second, subsequent image frame. In one embodiment, the underwater structure is fixed in space relative to the underwater vehicle 10. In another embodiment, the underwater structure can be moveable relative to the underwater vehicle 10. The video captured by the camera 18 is used to derive features on the underwater structure from a pair of image frames to estimate the travel velocity of the underwater vehicle 10 relative to the underwater structure.

Figure 2:
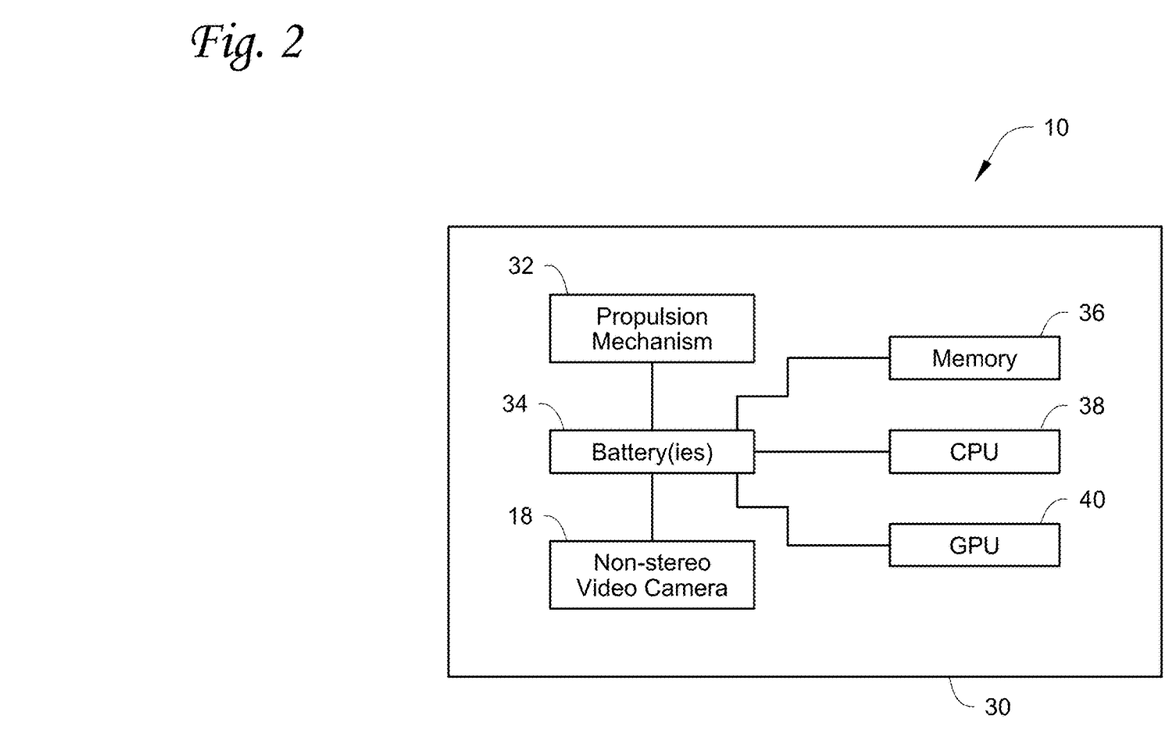
FIG. 2 is a schematic depiction of an underwater vehicle and select components thereof.

FIG. 2 is a schematic depiction of the underwater vehicle 10. The underwater vehicle 10 includes a fuselage 30, a propulsion mechanism 32, one or more batteries 34 (or other electrical energy supplies) for providing electrical power, the camera 18, at least one memory 36 (or other data storage) that permanently stores data and application programs, one or more data processors 38 such as a central processing unit (CPU), and one or more graphical processing units (GPU) 40. The underwater vehicle 10 can include additional components, such as sensors, depending upon the application of the underwater vehicle 10.

As indicated above, the two-dimensional video captured by the camera 18 is used to estimate the travel velocity of the underwater vehicle 10 relative to the underwater structure. The seemingly bland (i.e. featureless) nature of two-dimensional video data obtained underwater can make conventional approaches to image-based motion estimation difficult. To address this, as described further below, the described process uses image enhancement, followed by frame to frame image transformation, registration and mosaicking/stitching. With this process, the velocity components associated with the moving underwater vehicle are obtained from (i) the components of a transform matrix at each frame; (ii) information about the distance of the underwater vehicle 10 from the underwater structure (for example, the height of the underwater vehicle 10 above the sea floor 16); and (iii) the camera resolution.

Figure 3:
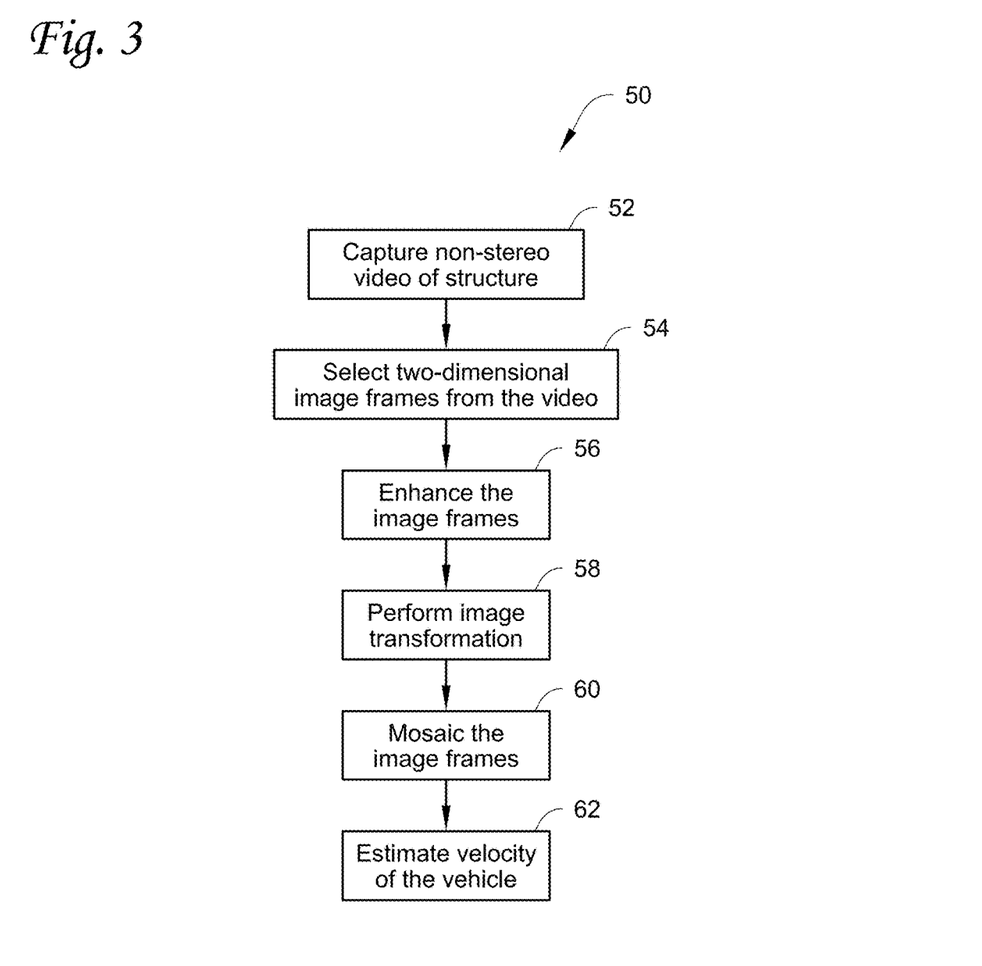
FIG. 3 illustrates an example of a method described herein.

FIG. 3 illustrates an example of a method 50 of estimating the velocity. The method 50 can include additional steps, and need not include all of the steps illustrated in FIG. 3. In the illustrated example, the method 50 includes capturing two-dimensional or non-stereo video of the underwater structure using the video camera at block 52. The video can be captured continuously the entire time the underwater vehicle 10 is traveling with the velocity being determined relatively continuously in real-time. Alternatively, the velocity can be estimated non-continuously, for example at predetermined intervals, using the continuously captured video or by capturing video non-continuously or over different sensing periods. In addition, the video can be permanently stored in the memory 36 for later processing at the end of the mission of the underwater vehicle 10.

At block 54, at least first and second two-dimensional image frames, for example from consecutive video frames or frames that are a small number apart from one another, are selected. The first and second image frames are captured at different times, reflecting the underwater structure at different times as the underwater vehicle 10 travels past the underwater structure(s). The camera 18 can be a color video camera in which case the image frames are in color. When the image frames are in color, the images are converted to grayscale since the feature alignment and intensity alignment discussed further below operate on intensity images. Alternatively, the camera 18 can be a black and white video camera that takes black and white video. The camera 18 can be pointed in any direction (e.g. downward, upward, sideways, or at any angle therebetween) to capture the video of the underwater structure. The camera 18 can also be adjustably mounted to allow it to be moved so as to point in any desired direction.

At block 56, the process then enhances the image frames. In one embodiment, each frame can be enhanced by a histogram modification algorithm which algorithms are well known in the art. Histogram modification as used herein is a general term for transforming intensity distribution in an image so that its new probability distribution function has useful properties for specific tasks. For example, the histogram algorithm can enhance the contrast of images by transforming the values in an intensity image, so that the histogram of the output image approximately matches a specified histogram. For a desired histogram g(x,y), the algorithm chooses the grayscale transformation T to minimize $|cT(z)-c_o(z)|$, where $c_o$ is the cumulative histogram of the image, c is the cumulative sum of g for all intensities z.

This minimization is subject to the constraints that T must be monotonic and c(T(a)) cannot overshoot $c_o(a)$ by more than half the distance between the histogram counts at a. g uses this transformation to map the gray levels in X to their new values: b=T(a). As an alternative to using histogram modification, one can utilize a contrast-limited adaptive histogram equalization function. While the histogram algorithm works on the entire image, an adaptive histogram modification algorithm operates on small regions in the image, called tiles. Each tile's contrast is enhanced, so that the histogram of the output region approximately matches a specified histogram. After performing the modification, it combines neighboring tiles using bilinear interpolation to eliminate artificially induced boundaries.

The use of a histogram modification algorithm exploits the empirical probability density function (PDF) (expected histogram) of the image of the unperturbed medium (in this case sea water) and modifies the captured image pixel values to match the unperturbed PDF. This avoids potential algorithmic-generated artifacts that general image enhancements may induce that could lead to large errors in velocity estimation. General histogram modification provides the basis for doing pixel modification so that the output has a flat PDF or some known PDF such as Gaussian. For an underwater medium such as sea water, the PDF of the unperturbed medium does not follow any well-known mathematically expressible forms. Accordingly, the techniques described herein: 1) generate the empirical PDF of the unperturbed medium or a model it; and 2) use that PDF to modify the image in situ to match the expected PDF.

At block 58, frame to frame image transformation is then performed, followed by mosaicing the two-dimensional image frames at block 60. The velocity of the underwater vehicle 10 can then be estimated at block 62.

EXAMPLE 1

The following is an example of how the two-dimensional video data can be processed to estimate the velocity of the underwater vehicle 10. It is to be realized that these are examples only and that other processing of the video data can be utilized. In this example, the two-dimensional video being captured is of the sea floor. However, the concepts illustrated in this example can be applied to captured video of other structures as well.

A two-dimensional image frame pair, for example from consecutive video frames or frames a small number apart, are selected from the video. An affine transformation of the form $$\begin{bmatrix} x^1 \\ y^1 \\ 1 \end{bmatrix} = \begin{bmatrix} m_1 & m_2 & m_3 \\ m_4 & m_5 & m_6 \\ 0 & 0 & 1 \end{bmatrix} \begin{bmatrix} x^0 \\ y^0 \\ 1 \end{bmatrix} \quad (1)$$

where (x0, y0) are the coordinates in the original frame of reference, and (x1, y1) are the coordinates in the new frame, is then fit. In this example, the affine transformation can include the following three parts:

(1) A coarse image registration based on corner features and a RANdom SAmple Consensus (RANSAC) fitting;
(2) A refinement step based on image intensity alignment and Levenberg-Marquardt optimization;
(3) A blending step where the two images are composited together.

In the coarse registration step, corners are detected in the two images. For example, corners can be detected using the techniques described by C. Harris and M. Stephens, in "A combined corner and edge detector", Proceedings of the 4th Alvey Vision Conference, 1988 (the Harris feature detection algorithm). The Harris feature detection algorithm is fast and suited to real-time applications.

Once the features are detected, a Singular Value Decomposition (SVD)-based feature matching technique is applied to find point correspondences, i.e., the corresponding feature points in the two image frames. An example of a suitable SVD-based feature matching technique is described in G. H. Golub, W. Kahan, "Calculating the singular values and pseudo-inverse of a matrix", Journal of the Society for Industrial and Applied Mathematics: Series B, Numerical Analysis, 2 (2), 1965.

To fit an affine transformation, at least 3 point pairs are required. In this example, to avoid over-fitting due to possible outliers, at least 8 point pairs are utilized. Using the image correspondences, a RANSAC algorithm fits a robust affine transformation M as shown in Equation (1) above. An example of a suitable RANSAC algorithm is described in M. A. Fischler and R. C. Bolles, "Random sample consensus: A paradigm for model fitting with applications to image analysis and automated cartography," Communications of the ACM, 24(6), 1981.

Figure 4:
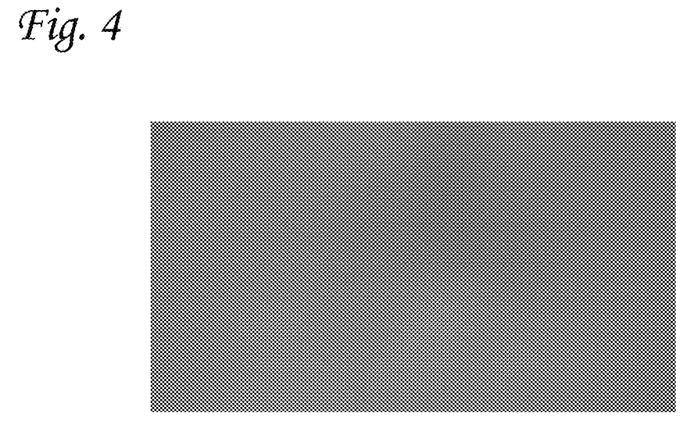
FIG. 4 illustrates an example of an image frame from a sequence of image frames obtained from a camera of the underwater vehicle.
Figure 5:
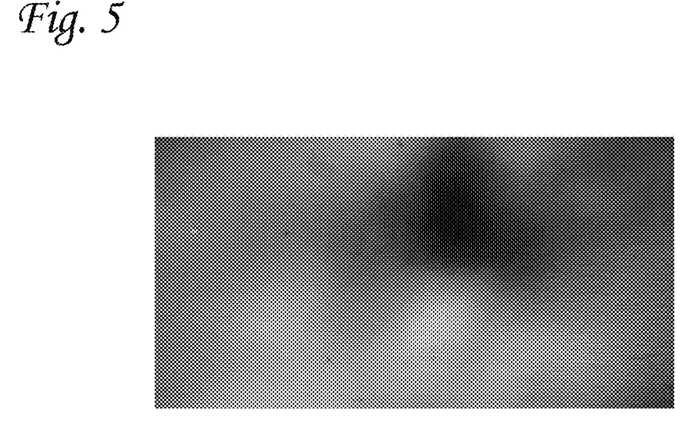
FIG. 5 illustrates an enhanced version of the image frame of FIG. 4.

The affine transformation matrix M obtained by the coarse registration step is then passed as an initial estimate to an intensity-based mosaicing step. In this step, a non-linear optimization technique known as the Levenberg-Marquardt algorithm (K. Levenberg, "A Method for the Solution of Certain Non-Linear Problems in Least Squares", Quarterly of Applied Mathematics 2, 1944; and D. Marquardt, "An Algorithm for Least-Squares Estimation of Nonlinear Parameters", SIAM Journal on Applied Mathematics 11 (2), 1963) is used to minimize the sum-of-squared-errors in the pixel intensities of the aligned images. It starts with the matrix M as the initial guess and refines it iteratively based on the intensity errors, to get a new and final transformation matrix M*. The new image is then transformed using the affine transformation M*, to the same reference frame as the original image. In an image sequence, all subsequent images are transformed to the reference frame of the first image, by accumulating the image transformations. FIG. 4 illustrates an example of an image frame from a sequence of image frames obtained from the camera of the underwater vehicle, and FIG. 5 illustrates the same image after it has been enhanced by this described technique.

In the blending step, the transformed new image is superimposed over the original reference image to form the composite mosaic image. Due to the blending of artifacts at the edges of the images in direct superposition, the algorithm uses a weighting mask to compute weighted-averaging of the two images using a weighting mask. This mask weights regions in the center of an image with greater confidence than the periphery regions. Hence, if an image region lies in the center of one of the image frames, that particular region in the mosaic image is filled with pixels taken entirely from this image since it has a higher weight in the region. In this manner the algorithm also avoids streaking effects due to moving objects.

The SVD-based feature correspondence technique is new to the image mosaicing domain, as it has been previously been used only for stereo vision. Further, the juxtaposition of a coarse registration and a Levenberg-Marquardt-based refinement step improves the quality of the image registration compared to prior art algorithms. To efficiently and effectively mosaic the image sequences, the image regions in the two frames should have sufficient features for matching and fitting the affine transformation. The RANSAC algorithm uses at least eight feature matches to perform a robust estimation of the transformation matrix. Further, image regions should be sufficiently diverse. A random spread of features, (which is often the case in general images) is well-suited to the process. The inter-frame displacement is also an important guiding factor in the image mosaicking process. In one example, a minimum of 30 percent overlap is required of the consecutive images being fed into the algorithm. If the image is rich in features, the amount of overlap may go down, and if the image has very little features, or if the features are concentrated in a very small region, more overlap may be needed.

Figure 6:
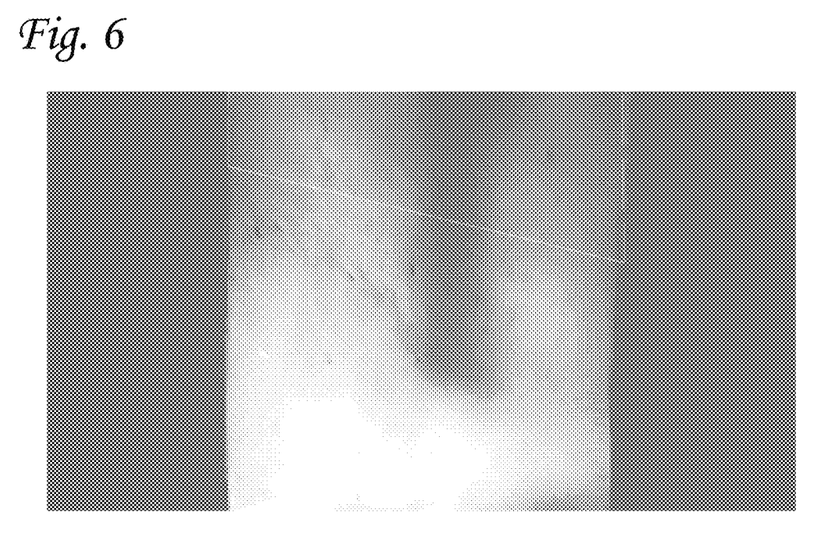
FIG. 6 is an example of a mosaic image of a sea floor that is formed by mosaicing a plurality of image frames from a sequence of image frames obtained from the camera.
Figure 7:
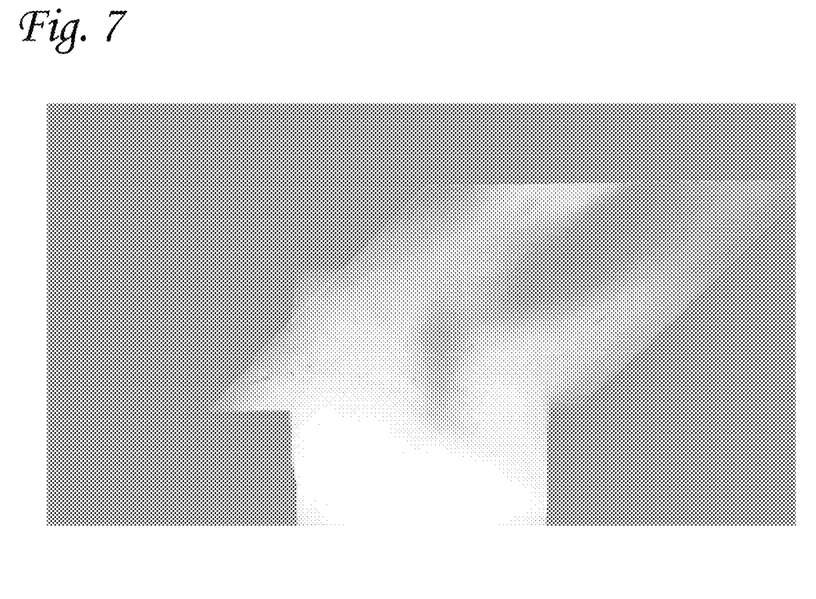
FIG. 7 is a larger view of the mosaic image of FIG. 6.

FIG. 6 illustrates an example of a mosaic image of the seal floor resulting from the technique described above that is formed by mosaicing a plurality of two-dimensional image frames, for example the first 200 frames, obtained from the camera 18. FIG. 7 is a larger view of the mosaic image of FIG. 6 covering a larger region of the seal floor. As can be seen, a good amount of sea floor detail can be observed.

Any suitable camera 18 can be used. In Example 1 described above, the camera was a GoPro® camera with a 1/2.5-inch back-illuminated CMOS with 12.4 Mpixels; MP4 video up to 4K/15p, 1080/60p and 720/120p; Waterproof to 40 m. The particular video that was used had 24 Bits Per Pixel: its Frame Rate was 29.9700, its Height: 1080 Number Of Frames: 32610 Video Format: 'RGB24' Width: 1920. For 1080 pixels width, the field of view (FOV) of the camera was 127 degrees which makes the angular resolution of each pixel ($\theta$) to be 0.11 degrees or 0.0019 radian. Using the formula: $x=r*\theta$, one obtains a ground pixel resolution at 4 meters height to be 0.0076 meters and at 100 meters to be 0.19 meters.

Figure 8:
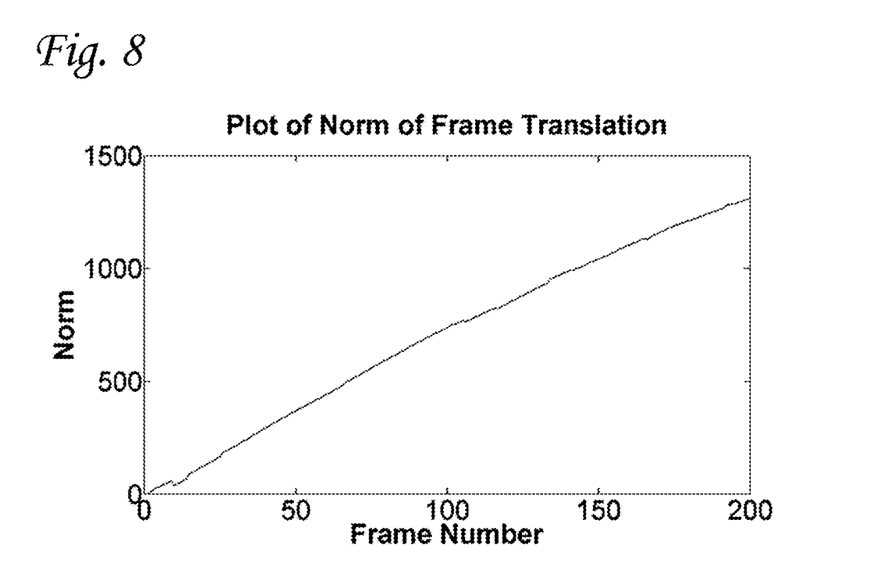
FIG. 8 is a plot of the norm of x and y components of the velocity vectors of the first 200 image frames from the video.
Figure 9:
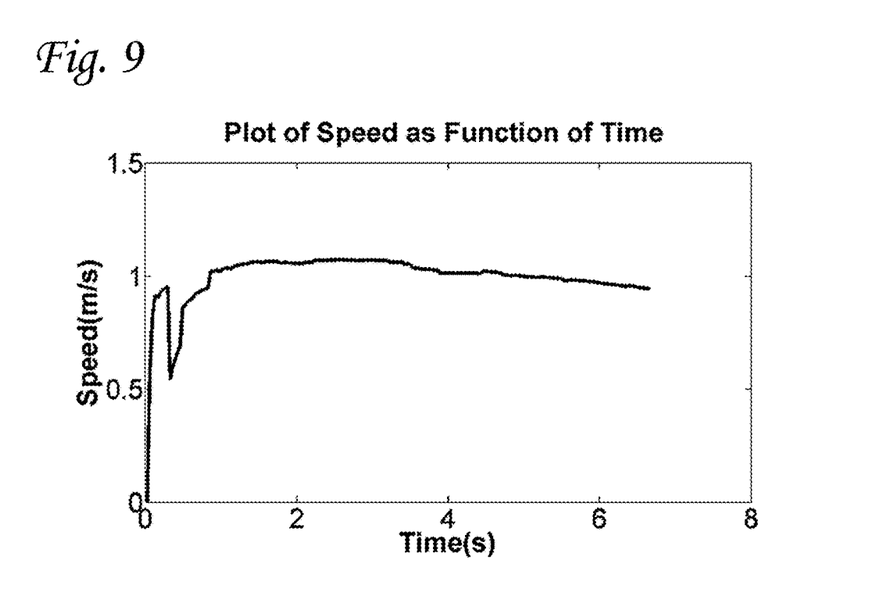
FIG. 9 is a plot of the estimated speed (relative to the underwater structure) of the underwater vehicle as a function of time.

Returning to FIG. 3 and block 62, the velocity of the underwater vehicle 10 can be estimated using the m13 and m23 elements in the frame to frame transformation matrix (Equation 1) discussed above. These two elements are associated with the x and y components of the velocity vectors of the frame, whose norm is displayed in FIG. 8 for the first 200 frames. The velocity components associated with the moving underwater vehicle 10 can then be obtained from the components of the transformation matrix at each frame, information about the distance of the underwater vehicle from the underwater structure, and the resolution of the camera. By using a frame to ground velocity conversion discussed above, a plot of ground speed or velocity of the underwater vehicle per second (using the frame rate of the sensor) can be obtained as illustrated in FIG. 9 which indicates that the underwater vehicle is initially gaining speed and then staying at a speed of around 1 meter per second.

The calculated velocity is an estimate only since there are sources of uncertainty in the calculation. For ease of description, a one dimensional motion is considered. However, the approach described herein can be extended to more general higher dimensions. In the velocity estimate described herein, there are two main sources of uncertainty: 1) Registration error in determining the shift in position of one image frame with respect to the other; and 2) Camera height error that might occur when using other sensors that would provide the distance above the sea floor. The error in velocity, V, is linearly related to the errors in registration and height above sea floor. As these errors increase the error in V increases also.

The following is an example of determining the velocity error.

Denote the pixel shift in the image frame that the algorithm computes as X and its error as dX.

Denote the resolution of each pixel on the sea floor as x and it error as dx.

Now $dx=dr.\theta$, where $\theta$ is the angular resolution of the sensor and we assume that it has negligible error.

The ground-based shift, (the number of meters that the underwater vehicle has moved during the time period between the frames.) is computed by $D=X.x$ so its associated error will be: $dD=xdX+X.dx=r\theta dX+\theta Xdr$.

Error in velocity V:

Consider $V=D/t$; where t is the time period between the frames.

Now denote the error in V as dV:

$$dV=dD/t$$

$$dV=q(r.dX+X.dr)/t.$$

An example velocity estimate using the result of the mosaicking imagery shown in FIG. 6 is as follows. The values and variables discussed below are examples only. In this example, the bottom part of the frame moved about 1000 pixels in 200 frames which makes the time to be: 200/30=about 6.66 seconds. Now using the equation $x=v*t$, one can estimate the velocity v to be $v=1080/6:66$=about 162.16 pixels per second. Now using the previous result for the estimated pixel ground resolution, $v=162.16*0.19$=about 30.81 meters per second (assuming that the distance from the camera to the sea floor was 100 meters). Now the average velocity for a UUV is typically around 1 to 4 knots (kt), so by using 1 kt=about 0.51 meters per second (mps) as a basis for conversion, the average velocity should be between about 0.51 to about 2.05 mps. This places the estimated velocity of about 30 mps too high. The estimated velocity value can be adjusted if we assume the UUV has a height above the sea floor of about 6 meters, whereby $v=162.16*(0.0019*6)$=about $0.3081*6$=about 1.84 mps which is within the typical range of UUV velocity. For a height above the sea floor of about 4 meters, the estimated velocity would be about 1.23 mps.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of real-time estimation of velocity of an underwater vehicle, comprising:

as the underwater vehicle is traveling underwater, capturing two-dimensional video of an underwater structure using a non-stereo video camera mounted on the underwater vehicle;

selecting first and second two-dimensional image frames from the two-dimensional video, the first and second two-dimensional image frames are captured at different times;

enhancing the first and second two-dimensional image frames to produce enhanced first and second two-dimensional image frames, wherein enhancing the first and second two-dimensional image frames comprises generating an empirical probability density function or model of the water the underwater vehicle is traveling in, and using the empirical probability density function or model to modify the first and second two-dimensional image frames in situ to match an expected probability density function or model; and estimating the velocity of the underwater vehicle using the enhanced first and second two-dimensional image frames.

2. The method of claim 1, wherein the underwater vehicle is an unmanned underwater vehicle, and further comprising outputting the estimated velocity to a navigation system of the unmanned underwater vehicle.

3. The method of claim 1, where the underwater structure is a sea floor.

4. The method of claim 1, further comprising performing image transformation and mosaicking of the enhanced first and second two-dimensional image frames.

5. The method of claim 1, wherein estimating the velocity of the underwater vehicle comprises generating a transformation matrix for each of the enhanced first and second two-dimensional image frames; and deriving velocity components of the underwater vehicle from the transformation matrix for each of the enhanced first and second two-dimensional image frames, information about the distance of the underwater vehicle from the underwater structure, and resolution of the non-stereo video camera.

6. A method of real-time estimation of velocity of a vehicle, comprising:

as the vehicle is traveling past a structure, capturing two-dimensional video of the structure using a non-stereo video camera mounted on the vehicle;

selecting first and second two-dimensional image frames from the two-dimensional video, the first and second two-dimensional image frames are captured at different times;

enhancing the first and second two-dimensional image frames to produce enhanced first and second two-dimensional image frames, wherein enhancing the first and second two-dimensional image frames comprises generating an empirical probability density function or model of the medium the vehicle is traveling in, and using the empirical probability density function or model to modify the first and second two-dimensional image frames in situ to match an expected probability density function or model; and estimating the velocity of the vehicle using the enhanced first and second two dimensional image frames.

\* \* \* \* \*